United States Patent
Davis et al.

(10) Patent No.: US 9,357,058 B2
(45) Date of Patent: May 31, 2016

(54) CONTACT CENTER ANTI-FRAUD MONITORING, DETECTION AND PREVENTION SOLUTION

(71) Applicants: Evan Davis, Santaquin, UT (US); Mitch Felling, Holladay, UT (US); Lyle Hardy, Holladay, UT (US)

(72) Inventors: Evan Davis, Santaquin, UT (US); Mitch Felling, Holladay, UT (US); Lyle Hardy, Holladay, UT (US)

(73) Assignee: Teleperformance SE, Paris (FR)

(*) Notice: Subject to any disclaimer, the term of this patent is extended or adjusted under 35 U.S.C. 154(b) by 0 days.

(21) Appl. No.: 14/750,997

(22) Filed: Jun. 25, 2015

(65) Prior Publication Data
US 2016/0065732 A1   Mar. 3, 2016

Related U.S. Application Data

(60) Provisional application No. 62/045,449, filed on Sep. 3, 2014.

(51) Int. Cl.
*H04M 3/00* (2006.01)
*H04M 5/00* (2006.01)
*H04M 3/38* (2006.01)
*H04M 3/51* (2006.01)

(52) U.S. Cl.
CPC . *H04M 3/38* (2013.01); *H04M 3/51* (2013.01)

(58) Field of Classification Search
USPC ........................................ 379/265.02, 265.09
See application file for complete search history.

(56) References Cited

U.S. PATENT DOCUMENTS

2005/0183072 A1* 8/2005 Horning ................ G06F 21/125 717/140
2012/0324359 A1* 12/2012 Lee ..................... G06F 11/3438 715/733

* cited by examiner

*Primary Examiner* — Quynh Nguyen

(57) ABSTRACT

A method of fraud detection is disclosed. The method includes determining that a first agent at a first workstation of a contact center is not on a call at a first time. The contact center includes a plurality of workstations attended to by a plurality of agents. The method includes determining that the first agent is accessing a client based resource at the first time, wherein the resource is associated with a client. The method includes collecting electronic evidence of the first workstation.

19 Claims, 12 Drawing Sheets

700D

700E

700F

CONTACT CENTER ANTI-FRAUD MONITORING, DETECTION AND PREVENTION SOLUTION

CROSS-REFERENCE TO RELATED APPLICATIONS

The present application claims priority to and the benefit of the commonly owned, provisional patent application, U.S. Ser. No. 62/045,449, entitled "CALL CENTER ANTI-FRAUD MONITORING, DETECTION AND PREVENTION SOLUTION," with filing date Sep. 3, 2014, which is herein incorporated by reference in its entirety.

BACKGROUND

A call center handles large volumes of requests by telephone or other similar communication technologies. For instance, these call centers are established to provide support and/or information to callers regarding products and/or services. The call center may be operated by the company associated with the product or service, or a third party assigned to provide customer support. As an advantage, collective handling of calls throughout a network of workstations manned by service representatives or agents promotes a hands-on approach when dealing with customers in that the call center is configured to enable a large number of calls to be handled on a personal basis.

In one implementation, an inbound call center manages incoming calls to provide services to incoming callers. For example, an inbound center may provide support to complete a sale, handle issues and problems with products (e.g., installation instructions, warranty service, etc.), handle calls related to services (e.g., banking, collections, police, fire, alarm, etc.), and other similar types of services.

In another implementation, an outbound call center initiates calls. For instance, the center may be configured to provide telemarketing for a product or service, enable the solicitation of charitable or political donations, provide debt collection services, perform polling or market research, etc.

Many individualized call centers are centralized to provide space for many agents. For example, a larger call center may support hundreds or thousands of workstations in a single building or campus of buildings. In that manner, maintenance and installation of all of the infrastructure (e.g., computers, workstation cubicle, etc.) is centralized.

The call center may represent a third party client, wherein the agent handles calls from customers on behalf of the third party client. As such, the agent may be authorized to access privileged client information using the client's databases. For example, the client may be a banking institution and the agent is handling a call to help a customer determine their account balance. In that case, the agent can access the customer's personal data controlled by the banking institution to provide an account balance.

However, there are instances where the agent is accessing privileged customer information when there is no legitimate need. That is, while a call center agent inherently has authorized access to personal and identifiable information, the agent should only use this access on a need to access basis. When fraudulent activity is occurring, not only may the agent be gathering critical personal information through unauthorized access, but that information may be later used to commit additional fraud (e.g., applying for credit, making purchase transactions, etc.).

What is needed is a way to combat fraud within a call center.

SUMMARY

In embodiments of the present invention, a computer implemented method for detecting fraud is disclosed. In other embodiments, a non-transitory computer readable medium is disclosed having computer-executable instructions for causing a computer system to perform a method for detecting fraud. In still other embodiments, a computer system is disclosed comprising a processor and memory coupled to the processor and having stored therein instructions that, if executed by the computer system, cause the computer system to execute a method for detecting fraud. The method includes determining that a first agent at a first workstation of a contact center is not involved in an interaction with a customer (e.g., on a call at a first time). The contact center includes a plurality of workstations attended to by a plurality of agents. The method includes determining that the first agent is accessing a client based resource at the first time. The resource is associated with a client, and for example may include personal and identifiable information that is associated with one or more customers and/or individuals, wherein the information may be used by the agent to perform a fraudulent activity. When the potential fraudulent activity is detected, the method includes collecting electronic evidence of the first workstation, wherein the evidence may be used to prove actual fraud by the agent.

In another embodiment, a computer implemented method for detecting potential fraudulent activity at a workstation and for taking preventative measures once potential fraudulent activity is detected. In other embodiments, a non-transitory computer readable medium is disclosed having computer-executable instructions for causing a computer system to perform a method for detecting potential fraudulent activity at a workstation and for taking preventative measures once potential fraudulent activity is detected. In still other embodiments, a computer system is disclosed comprising a processor and memory coupled to the processor and having stored therein instructions that, if executed by the computer system, cause the computer system to execute a method for detecting potential fraudulent activity at a workstation and for taking preventative measures once potential fraudulent activity is detected. The method includes determining that a potential fraudulent activity is conducted in a contact center comprising a plurality of workstations attended to by a plurality of agents. The method includes determining the potential fraudulent activity occurs at a first workstation. The method includes providing an event notification of the potential fraudulent activity on a contact center chart, wherein the contact center chart indicates locations of each workstation and status information for each workstation. The method includes capturing at least one image of the first workstation.

In still another embodiment, a system of monitoring workstations of a contact center is disclosed. The system includes a plurality of workstations of a section of a contact center, wherein each workstation comprises a computing system configured to access resources of a client over a first communication network. The plurality of workstations is attended to by a plurality of agents. The system includes a plurality of monitors associated with the plurality of workstations, wherein a first computing system of a first workstation comprises a first monitor configured to track activity performed by an agent on the first computing system. The system includes a security center coupled to the plurality of monitors over a second communication network. The security center is configured to receive from the plurality of monitors information related to a plurality of activities of a plurality of computing systems associated with the plurality of workstations. The system includes a chart identifying the plurality of workstations, wherein the security center generates and manages the chart based on the received information. The system includes a first icon representing a first workstation in the chart, wherein the icon is configured to give a status (e.g., log-in status, etc.) of an agent attending to the first workstation

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
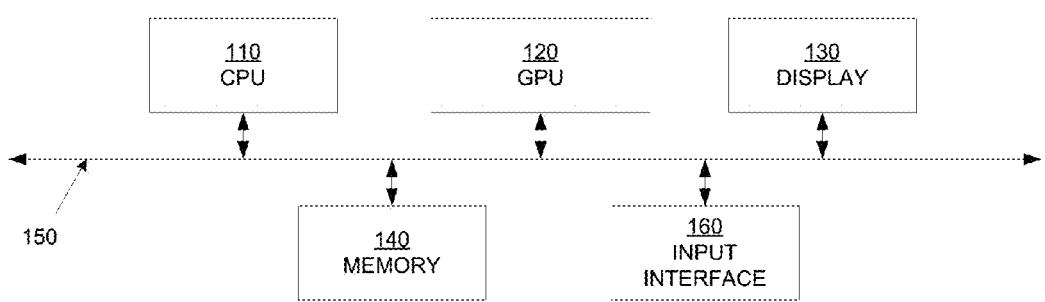
FIG. 1 depicts a block diagram of an exemplary computer system suitable for implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments of the present invention are described within the context of a contact center. The contact center is configured to provide services to customers on behalf of a third party client through various systems and methods of interacting and/or communicating with the client. Different configurations of a contact center include locating the contact center remotely from the customer and/or the client, locating the contact center locally to the customer and/or client, etc. In one illustration of a contact center, instead of using bank employees, a banking client may utilize a contact center to provide banking services to its customers, wherein agents of the contact center interact directly with the customers. For example, a call center illustrates one type of contact center and is configured to facilitate interactions and/or communications between agents and customers through a telephone network, such as handling incoming and outgoing calls.

Furthermore, a contact center is able to handle any type of interaction and/or communication between an agent and a customer. One type of interaction involves telephone communications between an agent and a customer through a phone network (e.g., mobile, public switched network, combinations of mobile and public switched network, etc.). For purposes of illustration only, other types of interactions and/or communications between an agent and a customer include video, text, text messaging, internet based communications, etc.

Accordingly, embodiments of the present invention provide for the ability to identify, collect evidence and prevent contact center agent fraud with specific use cases in contact center operations. Other embodiments of the present invention alerts or blocks (depending on configuration settings) fraudulent contact center agent access to customer personal and identifiable information.

Some strategists within the contact center industry accept fraud as an operating cost. For illustration, these strategists accept that contact center agents can abuse their privilege of wantonly accessing personal information (e.g., health and financial) from client resources (e.g., databases) relating to client customers in violation of various laws, including the Health Insurance Portability and Accountability (HIPPA) Act; they accept that agents currently steal financial information of a customer in order to make purchases for the benefit of the contact center agent; they accept that agents will knowingly ship replacement items under warranty to the agent's address instead of a customer's address; etc. These strategists promote an untenable business model that allows for fraud to permeate throughout a contact center.

Fraud need not be tolerated within the contact center industry. Fraud can be addressed through a three prong approach, including monitoring, detection, and prevention. Specifically, the first prong provides for monitoring of activity of contact center agents and/or the activity performed on resources utilized by the agents. The information can be collected and analyzed in real time or post occurrence. For example, a history of information can be collected for a single agent or a group of agents, such that statistical analysis can be performed, such as determining statistical averages for various activities. Other collection techniques are also well supported. The second prong provides for detection of potential fraudulent activity based on the information collected. For example, certain activity may match a pattern of activity known to be associated with fraudulent activity. In still other examples, the activities of an agent may be outside the statistical norms associated with a group of agents, and may indicate potential fraudulent activity. Once potential fraudulent activity by an agent has been flagged, additional investigation may be conducted to determine whether actual fraudulent activity has been conducted. The third prong provides for prevention of fraudulent activity. Prevention includes knowledge by the agent corps that they are being monitored, which provides a deterrent. Prevention also includes knowledge by the agent corps that the contact center is able to detect when fraudulent activity has occurred, which by itself also provides a deterrent. Further, prevention also includes knowledge by the agent corps that the contact center can and will prosecute an agent that is conducting fraudulent activity. Because evidence is collected during the monitoring process, and more specifically when potential fraud is detected, this evidence can be used to criminally prosecute the agent. The fact that criminal prosecution is on the table provides a deterrent. Embodiments of the present invention are implemented throughout this three prong approach to address and prevent fraud within a contact center.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "collecting," "capturing," "cross-referencing," or the like, refer to actions and processes (e.g., flowcharts 400 and 600 of FIGS. 4 and 6) of a computer system or similar electronic computing device or processor (e.g., systems 100, 200, and 300 of FIGS. 1-3). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
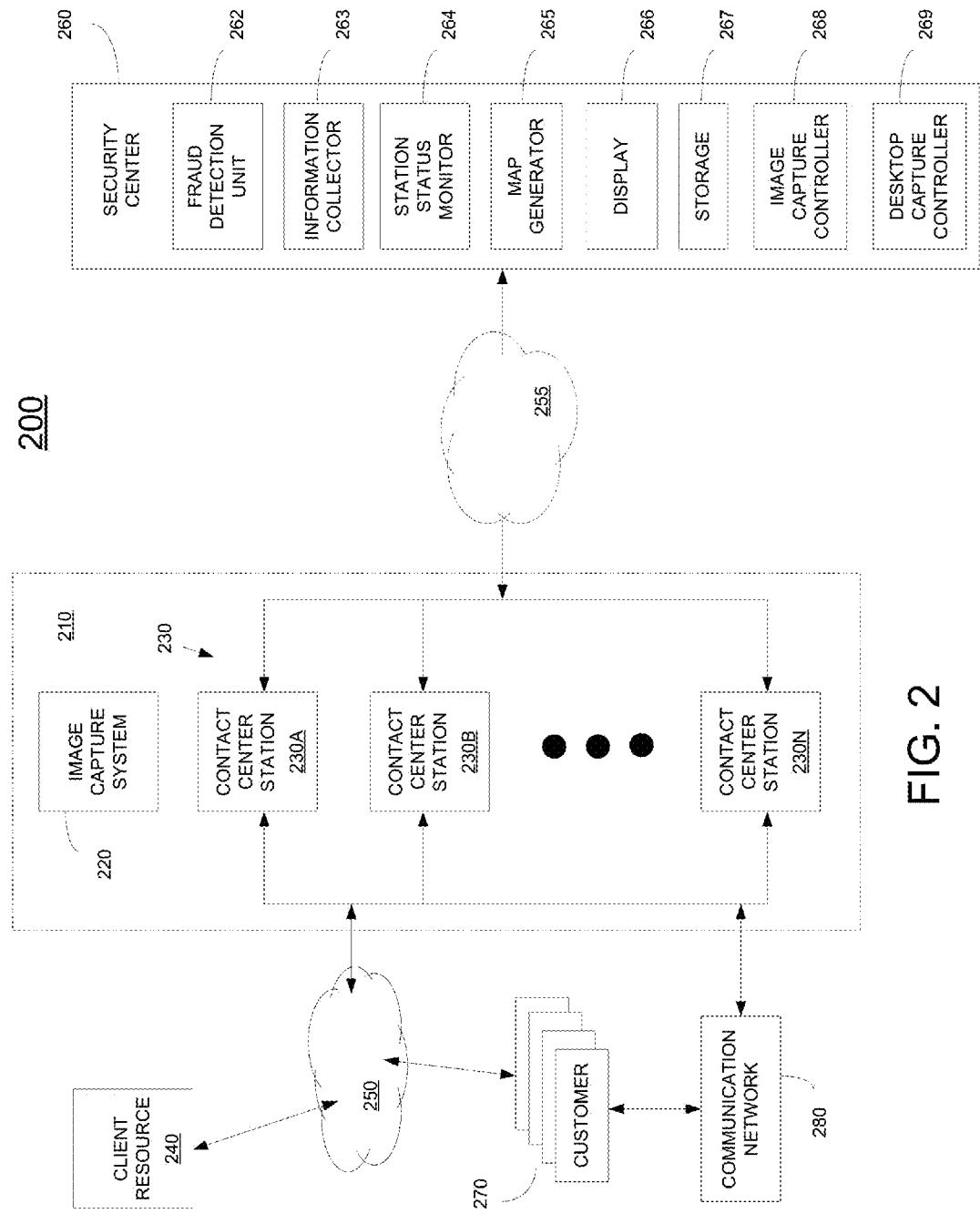
FIG. 2 is an illustration of a system configured for identifying potential fraudulent activity performed by an agent within a contact center, and taking preventative action once the activity is identified, in accordance with one embodiment of the present disclosure.

FIG. 2 is an illustration of a system 200 configured for identifying potential fraudulent activity performed by an agent within a contact center, and taking preventative action once the activity is identified, in accordance with one embodiment of the present disclosure. One or more components of system 200 are implementable by system 100 of FIG. 1 for purposes of monitoring activity of agents and/or workstations to identify potential fraudulent activity and to perform additional actions once the activity is detected, in accordance with one embodiment of the present disclosure.

System 200 includes a contact center 210 that is configured to handle interactions with customers, wherein agents of the contact center 210 are acting on behalf of a client. For example, the agents provide support and information to a plurality of customers 270 regarding products and/or services associated with the client. For purposes of illustration only, agents of contact center 210 may help a customer complete a sale of a product or service, help a customer access information managed by the client, or work with the customer to handle issues and problems with products or services provided or offered by the client.

The plurality of customers 270 may communicate with agents at the stations 230 through one or more communication networks 250 and 280. For example, communication network 250 may include a system of interconnected computer networks (e.g., internet) that allow for direct communication between a customer and a client. Also, communication network 280 may be any combination of phone networks that are configured to connect a customer to an agent at a particular workstation, such as a mobile phone network, a land-line based public switched telephone network (PSTN), etc.

In particular, a section of contact center 210 may include a plurality of workstations 230, including workstations 230A-N. For instance, the section may include workstations found on multiple floors, a floor, or portions of a floor of the contact center. The plurality of workstations 230 is attended to by a plurality of agents. Through centralization, the contact center 210 is able to efficiently install and maintain the workstation infrastructure. In addition, by providing a centralized location for workstations, agents have ready access to information, resources, and supervisor help to provide the highest quality of service to the customers of the client.

A workstation can be compartmentalized as a scalable unit, and is configured to provide essential resources that an agent utilizes to handle requests by a customer on behalf of a client. For example, in part a workstation can include a computing system (not shown), and telephone component (not shown) as implemented on a working platform.

The computing system is configured to access at least one resource 240 of a client over a communication network 250. For example, the computing system may execute a client application that is configured to access a database containing information related to a customer. The computing system may also be configured to provide communication between a customer and an agent. For example, the communication may include internet based voice communications, navigation of a shared website accessed simultaneously and in conjunction by the customer and the agent, text based communication, etc.

The telephone component of a workstation is configured to provide communication (e.g., voice) between a customer and an agent attending to the workstation. For example, the telephone component may be coupled to a corresponding phone of the customer via communication network 280 and/or network 250.

Contact center agents by design have access to personal and identifiable information of clients that are maintained by a corresponding client. For example, a client that is a bank may store personal information used to identify customers, and other banking information related to the customer (e.g., customer assets, etc.), while another client (e.g., insurance company, health care provider, and others) may have access to health records of individual employees and/or customers. Because that information (e.g., financial and health) is readily accessible, an agent may potentially use that information for personal gain. For example, an agent may apply for credit using information related to a customer, an agent may purchase online items using credit card information associated with a customer, or an agent may sell personal health information of a well-known customer.

Unfortunately, fraudulent activity is conducted on a frequent basis by agents of a contact center. While the contact center industry has acknowledged this fraudulent activity, the industry has heretofore accepted and absorbed losses due to that activity. These losses can be unsustainable in an era where identity theft is more prevalent and viewed by the ordinary public as unacceptable. As such, embodiments of the present invention can be used to combat fraudulent activity being conducted by agents of a contact center. More specifically, embodiments of the present invention are able to identify and detect when potential fraudulent activity is being conducted by agents, and to take measures that are able to remedy any fraudulent activity and deter further fraud from being conducted.

More particularly, the plurality of workstations 230 is configured with a plurality of monitors. That is, each workstation includes a monitor that is configured to track activity of a corresponding computing system. In one embodiment, the monitor is configured within a computing system located at the corresponding workstation. In another embodiment, the monitor is remotely located, and is configured to receive information collected from a workstation to determine when potential fraudulent activity has occurred. In still another embodiment, the monitor may be in one or more locations, such as locally on the computing system, and remotely at a security center.

In addition, system 200 includes a security center 260 that is communicatively coupled to the plurality of workstations 230, and is configured to receive information related to activities being performed by agents on a plurality of computing systems associated with the workstations 230. In one embodiment, the security center 260 receives information from a plurality of monitors, each of which is located locally in relation to a corresponding workstation. For instance, information collector 263 of the security center 260 is communicatively coupled to each of the workstations 230A-N, and is configured to receive information that can be used to monitor activity of agents and can be used to determine when potential fraudulent activity is being performed. The information may be stored at storage 267 for later access, such as when performing analysis on the information at a later time.

In one embodiment, fraud detection may be performed locally at a corresponding monitor of a workstation, or may be performed remotely at the security center 260, wherein the detection is based on the information collected from the monitor of the corresponding workstation. For example, security center 260 may include a fraud detection unit 262 that is configured for detecting potential fraudulent activity being performed by an agent at a workstation. In another embodiment, the fraud detection unit 262 is located at a workstation, wherein the detection and subsequent measures taken are controlled locally at that workstation. In still other embodiments, fraud detection is performed at multiple locations, such as locally at the workstation and remotely at the security center.

Additionally, a workstation or station status monitor 264 is included within security center 260, and is configured to determine the status of each workstation and/or the status of the agent attending that workstation. For example, the status monitor 264 is able to determine when a workstation is offline (e.g., the workstation is locked), and when the workstation is online; can determine when the agent is handling an interaction or is involved in an interaction (e.g., on a call) with a customer; when the agent is available to handle an interaction (e.g., take a call); when the agent is busy and is unavailable to handle an interaction with a customer (e.g., cannot take a call from a customer); and when the agent is out to lunch. As such, a status of the agent and/or resources of the workstation may be provided.

In still other embodiments, the status monitor 264 is able to analyze and determine moods of agents based on information received from the monitors at each workstation. For example, the status monitor may be able to determine when the agent is stressed, angry, or satisfied.

Security center 260 includes a map generator 265 that is configured to identify the plurality of workstations. For example, map generator 265 is able to generate a chart that identifies the locations of each of the workstations, and is able to convey additional information related to the status of agents and/or workstations via the chart. The generated chart may be displayed at the security center 260 on a display 266.

Security center 260 also includes an image capture controller 268. Once potential fraudulent activity is detected (e.g., by the fraud detection unit 262), the image capture controller 268 is able to instruct an image capturing system 220 that is located within the section of the contact center to capture at least one image of the workstation that is associated with the potential fraudulent activity. For example, the image capture controller 268 may relay information identifying the workstation so that the image capture system 220 can select at least one device (e.g., image or video camera) to orient itself in order to capture a frontal view of an agent attending to that workstation. In that manner, if fraud is confirmed, an image of the agent performing the fraud may be captured. In another embodiment, the image capture controller 268 is able to instruct an image capture device located in the computing system of the workstation to capture an image. For instance, a capture device may be located on the display of the computing system, and is able to capture an image of an agent that is viewing the display.

In addition, security center 260 also includes a desktop capture controller 269. Once potential fraudulent activity is detected (e.g., by the fraud detection unit 262) at a workstation, the desktop capture controller 269 is able to instruct the computing system at the workstation and/or the monitor at the workstation to capture one or more desktop images of the computing system. For example, images are collected for a period of time sufficient to determine whether fraudulent activity was actually performed by an agent at the corresponding workstation. In that manner, if fraud is confirmed, one or more images of the fraud being performed using the computing system may be captured as evidence. The evidence may be used to prove the fraud, and that evidence may be used when terminating and/or prosecuting the agent in criminal and/or civil courts.

Figure 3:
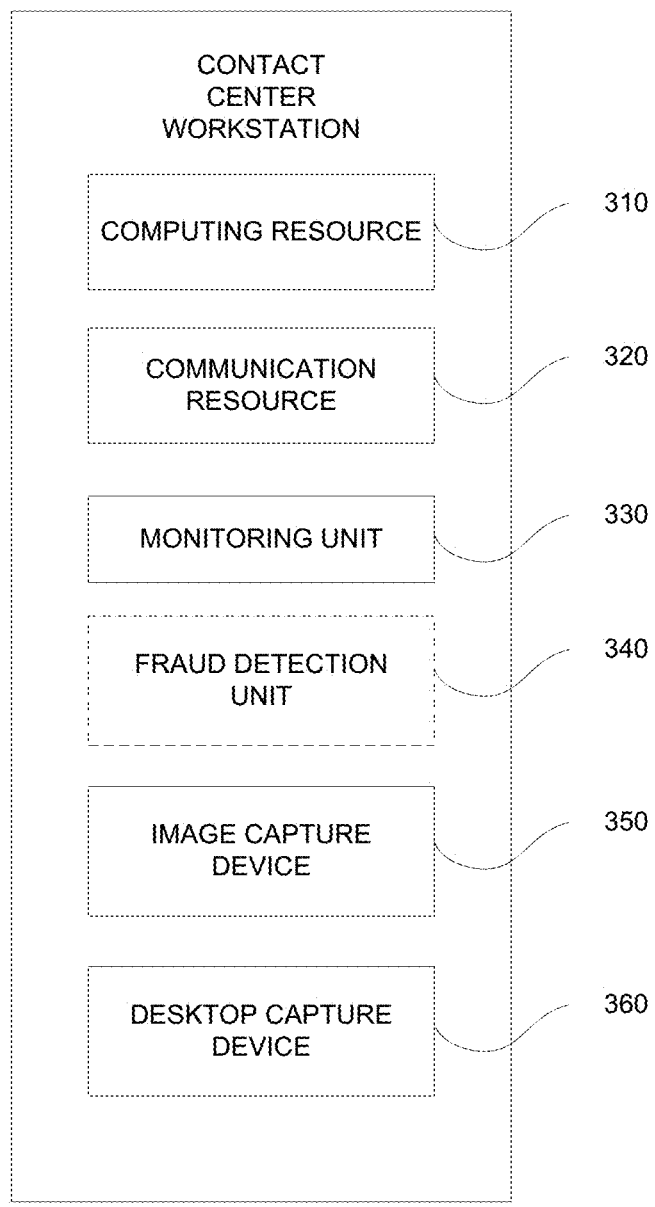
FIG. 3 is a block diagram of components of a contact center workstation that is configured for monitoring the activity of a contact center agent in order to identify potential fraudulent activity performed by the agent, in accordance with one embodiment of the present disclosure.

FIG. 3 is a block diagram of components of a contact center workstation 300 that are configured for monitoring the activity of a contact center agent in order to identify potential fraudulent activity performed by the agent, in accordance with one embodiment of the present disclosure. Workstation 300 is implementable by system 100 of FIG. 1 for purposes of monitoring activity of a corresponding agent and/or workstation to identify potential fraudulent activity and to perform additional actions once the activity is detected, in accordance with one embodiment of the present disclosure. Further, workstation 300 is representative of workstations 230A-N in FIG. 2.

Workstation 300 is configured to enable real-time monitoring, fraud detection, and fraud prevention, as implemented through embodiments of the present invention. For instance, different components of workstation 300 operate together to track agent activity in order to detect and document fraudulent activity, and to take subsequent action in order to prevent future fraud.

As previously described, each workstation in a contact center may be organized as a scalable unit, and contains essential components to enable an attending agent to communicate with a customer, and to provide services to that customer on behalf of a client. For instance, communication resource 320 allows for the agent to communicate with the customer, and may include a telephone or other voice or text based device. Also, workstation 300 includes a multi-purpose computing resource 310. In one implementation, computing resource 310 is configured to access client resources. For example, when handling or involved in an interaction with a customer (e.g., handling a call from a customer), the agent acting on behalf of the client and through the computing resource 310 has access to client based resources (e.g., applications, databases, etc.) that contain personal and identifiable information related to the customer. In addition, computing resource 310 may be configured to enable primary or supporting communication with a customer. For instance, resource 310 may be used for enabling or facilitating simultaneous access of a website by the customer and the agent. Additionally, capabilities of computing resource 310 may be utilized to implement tracking of agent activity on computing resource 310, detection of fraud, and/or prevention of fraud independent of or in conjunction with other components in workstation 300, or remotely located components or devices (e.g., located at a security center).

Workstation 300 also includes monitoring unit 330, which is configured to track activity of components within workstation 300 and/or activity of the corresponding agent alone or in conjunction with those components. In implementations, monitoring unit 330 can be a standalone unit, or can be included within the computing resource 320. For example, monitoring unit 330 can be configured to track activity performed on the communication resource 320, such that a usage log can be generated indicating at what times the communication resource 320 was in use, presumably by a corresponding and expected agent. Monitoring unit 330 is also able to record conversations held through the communication resource 320. In that manner, monitoring unit 330 can track when computing resource 310 is logged-in to and logged-out from the contact center and/or resources at a corresponding workstation, when computing resource 310 is executing an application of a client, when computing resource 310 is accessing a particular resource of the client, and any other quantifiable activity that is conducted on the computing resource 310.

Further, monitoring unit 330 is able to track the status of an attending agent at workstation 300 based on input provided to the computing resource 310 by the agent. For example, monitoring unit 330 is able to determine the availability of the attending agent based on the log-in status of the computing resource 310. In other instances, monitoring unit 330 is able to track when the agent is on a break, or out to lunch, based on the history of activity the computing resource 310, or based on log-in status provided by the agent to the resource 310.

In addition, monitoring unit 330 is able to track emotional state of the agent. For example, based on supporting evidence collected directly by monitor 330, an inference can be made on the emotional state of the agent. As an illustration, facial expressions, the volume level, rate of speaking, heart rate, other biometric measurements, etc. can be used to determine the emotional state of an agent.

Based on the information collected by monitoring unit 330, further analysis can be performed. For example, information collected from one or more workstations can be used to establish a baseline of agent activity specific to an individual agent, or to agents treated as a group. Illustrations of baseline data include average time handling or being involved in an interaction with a customer, average time assisting a customer on a call, average time accessing a client resource, the number of times a client resource is accessed, the time an agent has placed customers on hold, etc. This information may be used to rate the performance of a particular client based on a comparison to the statistical average. This information may also be used to determine whether potential fraudulent activity has occurred, such as when agent activity falls outside of the statistical norm, as will be described more fully below.

Workstation 300 optionally includes a fraud detection unit 340. Based on the information collected by monitoring unit 330, fraud detection unit 340 can determine when certain activities, or combination of activities performed on or by the components of workstation 300 and/or the attending agent indicates that potentially fraudulent activities are being performed by the agent. For example, as determined by fraud detection unit 340, the information collected may match certain rules or patterns of activities known to occur when fraud is preformed. In other instances, potential fraudulent activity may be detected when agent activity falls outside the statistical norm of a group of agents, or that particular agent. As such, detection unit 340 may provide notification that potential fraudulent activity is being conducted at the workstation 300 by an agent. For example, notification may be provided through a chart of the contact center.

The analysis performed to detect potential fraudulent activity may be performed by a local fraud detection unit 340, a remote fraud detection unit (e.g., located at a security center), or a combination of the local and remote fraud detection units. In addition, the detection of potential fraud may occur in real-time, or after the potential fraudulent activity has occurred, such as during a post occurrence period of analysis.

Workstation 300 includes an image capture device 350. Once a potential fraudulent activity has been detected by unit 340, the image capture device 350 may be activated to visually record activity by the agent at the workstation. For example, the image capture device 350 may be integrated with a display and instructed to capture a facial view of the agent. In this manner, an image of the agent conducting the potential fraudulent activity is collected to identify the agent, and also saved for evidence. Additional information (e.g., log-in information, log-in biometrics, biometrics, etc.) may be cross-referenced to verify the identity of the agent whose facial image is captured. The image capture device 350 of the workstation 300 may work in conjunction with a contact center image capture system having capture devices located throughout the contact center, such as at workstations and/or more generally located in and about a floor of a contact center.

Workstation 300 includes a desktop capture device 360. Once a potential fraudulent activity has been detected by unit 340, the desktop capture device 360 may be activated to collect one or more images of the desktop as viewed by the agent on the display associated with the computing resource 310. The desktop capture device 360 may be integrated or independent of the computing resource 310. In that manner, one or more images of the desktop while fraud is being performed may be captured as evidence and used when terminating and/or prosecuting the agent in criminal or civil courts. One or more devices throughout the system are oriented (e.g., pan, tilt, and zoom) to capture a frontal view of an agent conducting the potential fraudulent activity. As previously described, additional information may also be collected from the resources available to an agent at a workstation that may or may not be presented on a desktop. This information may be collected using the desktop capture device 360, and/or an associated monitoring device. For instance, the internet protocol (IP) address of a client resource that is accessed by the agent is recorded, time stamps of when the agent is using a workstation resource, etc.

Figure 4:
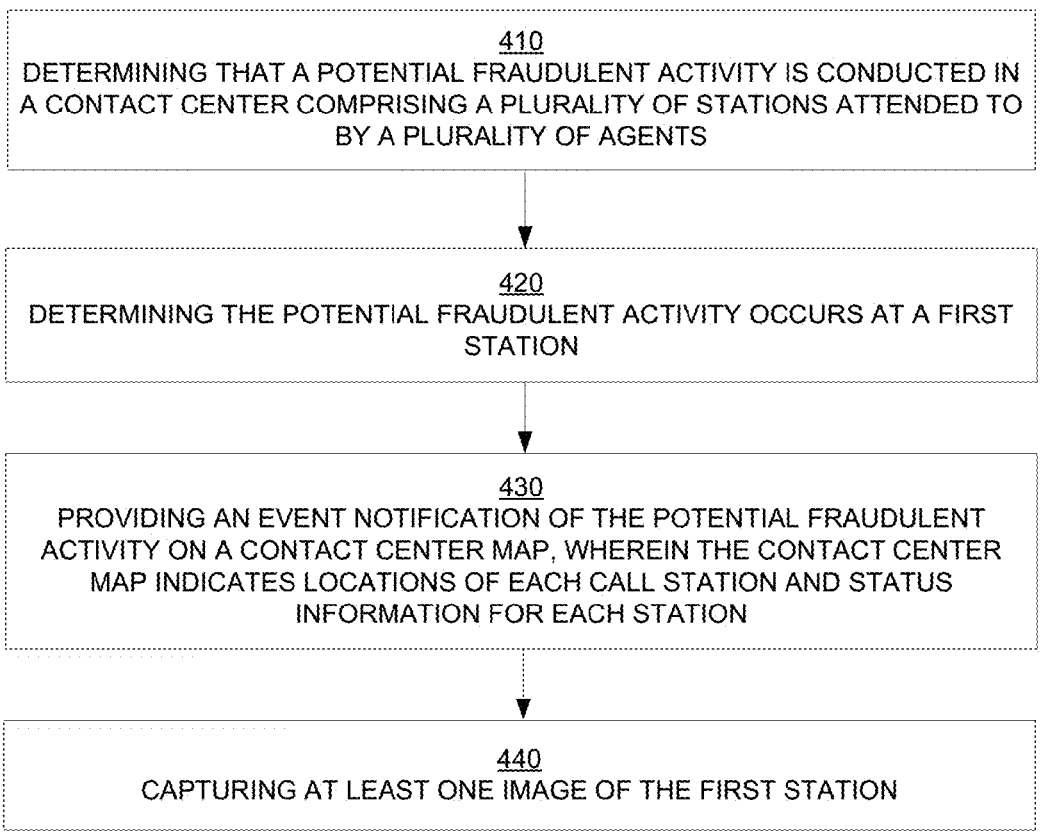
FIG. 4 is a flow diagram illustrating a method for detecting fraudulent activity and taking preventative measures once the potential fraudulent activity is detected, in accordance with one embodiment of the present disclosure.
Figure 6:
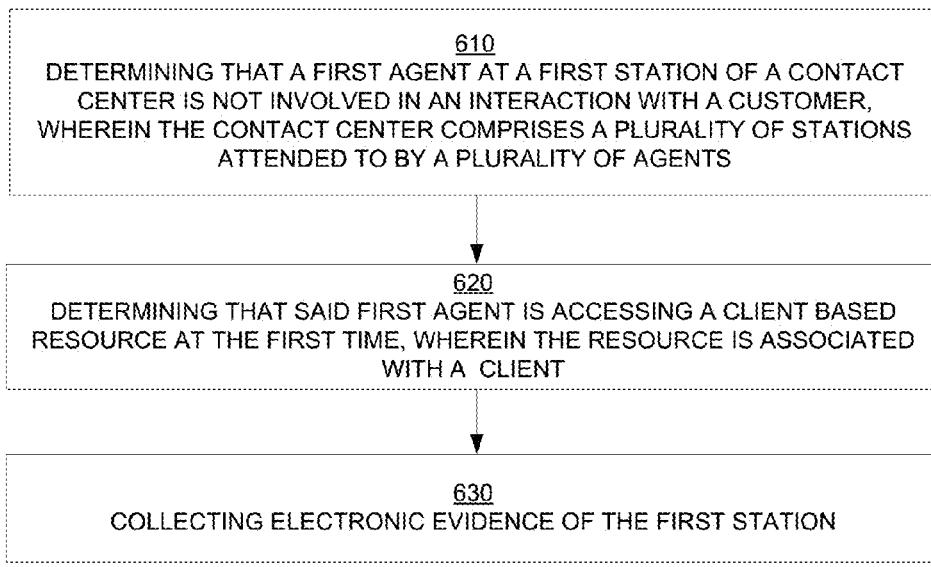
FIG. 6 is a flow diagram illustrating a method for performing fraud detection, in accordance with one embodiment of the present disclosure.

While embodiments of the present invention are described within the context of detecting potential fraudulent activity in real-time, the methods described in flow diagrams 400 and 600 of FIGS. 4 and 6 are well suited to the detection of potential fraudulent activity post occurrence. For example, information related to agent activity over a 24 hour period may be delivered to a security center for fraud detection analysis. Once potential fraudulent activity has been detected, further investigation may be performed using the collected information, or by closely monitoring activity of a suspected agent in the future.

FIG. 4 is a flow diagram 400 illustrating a method for detecting potential fraudulent activity and taking preventative measures once the fraudulent activity is detected, in accordance with one embodiment of the present disclosure. In still another embodiment, flow diagram 400 illustrates a computer implemented method for detecting potential fraudulent activity and taking preventative measures once the fraudulent activity is detected. In another embodiment, flow diagram 400 is implemented in part within a fraud detection system that includes a computer processor, and memory coupled to the processor and having stored therein instructions that, if executed by the computer system causes the system to execute a method for detecting potential fraudulent activity and taking preventative measures once the fraudulent activity is detected. In still another embodiment, instructions for performing a method as outlined in flow diagram 400 are stored on a non-transitory computer-readable storage medium having computer-executable instructions for causing a computer system to perform a method for detecting potential fraudulent activity and taking preventative measures once the fraudulent activity is detected. In embodiments, the method outlined in flow diagram 400 is implementable by one or more components of the systems 100, 200, 300, and 500A of FIGS. 1-3 and 5, respectively.

At 410, the method includes determining that a potential fraudulent activity is being conducted in a contact center, wherein the contact center comprises a plurality of workstations attended to by a plurality of agents. For example, the contact center may be representative of contact center 200 of FIG. 2.

The method includes monitoring a plurality of agents in a contact center comprising a plurality of workstations. Each of the plurality of agents is assigned to one of the plurality of workstations. For example, the contact center may be configured to handle interactions with customers while representing a client. For example, the contact center may be configured to handle calls for a client (e.g., bank, department store, etc.), and as such, the plurality of agents may handle a plurality of incoming and outgoing calls. As previously described, the monitoring allows for the collection of information related to the activities of the agents and/or activities being performed on resources utilized by the agents. In one embodiment, monitoring of electronic activity of the agents is performed (e.g., computer activity, phone activity, etc.). Further, the monitored information may be collected at a centralized location for storage and analysis. In one implementation, the method includes monitoring a first agent at a first workstation, and in particular monitoring the interactions of the agent with the resources (e.g., computing resource) of the workstation. In addition, agent interaction with a client resource may be monitored. For example, the interaction with a client database is monitored. Further, agent interaction with the communication system is monitored to determine when the agent is handling or is involved in an interaction (e.g., on a call), and whether the agent is available to help a new customer through another interaction (e.g., take another call).

In one implementation, the monitoring is continuous, wherein the monitoring is performed when the agent is handling or is involved in an interaction (e.g., handling calls), and when the agent is not handling or is not involved in an interaction. That is, all activity of the agent and/or activities being conducted on the resources of the workstation are monitored. In other implementations, the monitoring is periodic or randomly performed. For example, only a statistical sample is needed to determine fraudulent activity, and rather than wasting resources, the monitoring is performed on a less than continuous basis.

Various techniques may be implemented to determine that activity of an agent is potentially fraudulent, and requiring further attention. For instance, in one embodiment, an agent may be engaged in suspicious activity that is generally indicative of fraudulent activity. In particular, when an agent is accessing personal and identifiable information (e.g., through a client database) related to a customer of a client, but is not helping the customer (e.g., not on a call with customer), then that activity is suspicious. This activity may be identified as matching the criteria, and leading to a determination that potential fraudulent activity may have been conducted by the agent. Further investigation may be necessary to determine if actual fraud has occurred. On the other hand, if the monitoring determines that the positioned agent is accessing a client database for customer information, and that the agent is currently helping that customer related to the accessed information, then the activity and access to the client database is authorized. FIG. 6 provides a detailed discussion on the detection of potential fraudulent activity that matches a certain set of criteria.

The determination that potential fraudulent activity has occurred may be performed at a security center that is centralized to a plurality of workstations of a contact center. In particular, the security center is configured to receive a plurality of information related to the activities of agents and/or activities being performed on resources of the plurality of workstations. That information, collected at each of the workstations, is then delivered over a communication network to the security center for further analysis, and more specifically for determining when potential fraudulent activity has occurred.

For example, the determination that potential fraudulent activity has occurred is based on whether the information relating to activities of an agent and/or activities being performed on resources of a workstation violate any pre-defined or pre-determined rules. The rules may be defined by one or more parameters, and/or criteria. More particularly, it may be determined that potential fraudulent activity has occurred when the information indicates a violation of a rule. As an illustration, the rule may define a baseline of transactions, actions, or activities performed by one or more agents in conjunction with the use of workstation resources (e.g., phone, computing resource, etc.). For example, the baseline may be defined by a statistical average in relation to an activity associated with the agent and/or the plurality of agents. In addition, the baseline may be directed or correspond to at least a first activity. For example, the baseline may describe the average number of outbound calls made by agents over a predefined period of time (e.g., 1 hour, 2 hour, daily shift, etc.). In another example, the baseline may describe the number of times an agent places customers on hold over a period and/or the duration of the hold time each time a customer is placed on hold. An outlier condition that is performed by an agent may be monitored and discovered, wherein the outlier condition lies outside of the baseline. That is, the outlier exhibits unusual patterns of activity. If the outlier condition satisfies the rule (e.g., parameters and/or criteria), then a determination can be made that potential fraudulent activity has occurred. Further, the outlier condition may be matched with known fraudulent activity that is associated with the rule. Because outliers may happen upon occasion, unusually high numbers of outliers may be an indication of fraud. Additional investigation is necessary to determine whether there is actual fraud.

In one example, potential fraud activity by an agent occurs when there are excessive caller hold times, when compared to a statistical average of a plurality of agents in the contact center. An agent who is recorded as having excessive hold times, may be attempting to fraudulently access personal and identifiable information while having an active phone call with a customer. In this scenario, in an effort to beat an anti-fraud solution, the contact center agent might put a valid phone customer on hold and then access another customer's personal and identifiable information.

In still another example, potential fraudulent activity by an agent occurs when an agent generates an outbound call at a time that is incongruous with actions of other agents. That is, the typical pattern of the agents in the contact center shows that agents are handling inbound calls. Another pattern may show that the individual agent over a historical period has only handled inbound calls. The contact center agent might try to beat an anti-fraud solution by establishing a fake "phone call" simply by making an outbound call, and then fraudulently accessing customer personal and identifiable information.

In another example, potential fraudulent activity by an agent occurs when an agent is accessing forms and exhibits characteristics outside of a statistical average including actions of other agents or that particular agent. For example, the agent's duration within identified forms or pages of the application is compared to the normal baseline based upon statistical averages of all contact center agents to determine any deviation.

At 420, the method includes determining that the potential fraudulent activity occurs at a first workstation. In particular, the identity of the workstation is important for purposes of identifying which agent or individual is performing the activity. The identity of the workstation is determined from the information used to determine that potential fraudulent activity has occurred. For example, identifying information of a computing resource upon which the activity occurred may be cross referenced to determine the corresponding workstation within which the activity was performed. Upon identification, additional information related to the workstation may be gathered, such as determining the agent who is scheduled to work at the time when the potential fraudulent activity occurred.

At 430, the method includes providing an event notification of the potential fraudulent activity. The event notification may include the information used to determine that potential fraudulent activity has occurred, and may include information identifying the workstation, and any additional information identifying the agent involved in the activity. For example, the notification may be provided to a security specialist (e.g., a Risk Analyst) located at a security center. The security specialist is trained to analyze the collected information indicating that potential fraudulent activity has occurred, and to perform additional investigation to determine whether actual fraud was performed. The security specialist may perform additional monitoring to determine whether the agent is in fact performing fraudulent actions. For example, the security specialist may monitor activity of the agent and/or resources of the workstation for a period of time to determine if the previously identified activity is fraudulent, or if the agent is currently conducting fraudulent activities. The review of agent activity and/or evidence in relation to a event notification of potential fraudulent activity by the security specialist may occur in near real-time or at a later time in relation to the occurrence of the potential fraudulent activity. That is, the agent activity as well as any triggers (e.g., event notification, rule violations, etc.) of potential fraudulent activity is stored and accessed at a later time for analysis. In other embodiments, the additional monitoring may be automatically performed by a monitoring system.

In one embodiment, the event notification is provided on a contact center map or chart, wherein the chart identifies a plurality of workstations and/or provide status information for each workstation. For instance, the chart may indicate the locations of each workstation. For example, the chart may illustrate a section of a contact center, and include the locations of workstations throughout a floor layout of a building floor. In that manner, each workstations of the contact center section is represented on the map.

Further, the workstations may each be represented by one or more icons. An icon may reflect status information of the workstation and/or the agent that is scheduled to attend to the workstation. The status information is based on the information related to agent activity and/or activity being performed on workstation resources that are received from each of the workstations. For example, status information may include whether the agent is logged in or out of the contact center system, whether the agent is handling or is involved in an interaction, whether the agent is on a call, whether the agent is out to lunch, whether the agent is available to take a call, whether the agent is available to handle another interaction with another customer, etc. In addition, the icons on the chart may indicate whether there is potential fraudulent activity being conducted at the workstation, or whether potential fraudulent activity was conducted in the past at the workstation. A more detailed discussion of the contact center chart and workstation icons is provided in relation to FIGS. 7A-K, below.

At 440, the method includes capturing at least one image of the first workstation. This information may be collected for additional evidence showing fraud, and also more particularly is collected for purposes of identifying the agent who is related to the potential fraudulent activity determination (i.e., the agent who is potentially committing fraud). For example, at least one image frame captures a frontal view of the first workstation, and more particularly, a frontal view of the agent attending to the first workstation. This may include aiming at least one image capturing device (e.g., camera) at the first workstation. For instance, an image capturing device may perform a series of operations in order to capture the corresponding image(s). The operations include panning the device in a direction so that the device is capable of viewing the first workstation. In addition, the image capturing device is titled at an angle so that the device is capable of viewing the first workstation. While at this point, a captured image will include the workstation, the magnification may be too small to show relevant information, and as such, the operations may include zooming the image capturing device to a higher magnification in order to obtain a magnified view of the workstation and/or agent attending to the first workstation.

In one embodiment, the method includes determining an identity of a positioned agent that is attending to the first workstation, and storing that identity. This is accomplished by capturing identifying information of the positioned agent. For example, the at least one image that is captured may be used for identification purposes. Specifically, first identifying information may include a facial image of the positioned agent. Additional information may be collected and/or determined to positively determine the identity of the positioned agent. For instance, second identifying information may be determined that is associated with an agent that is scheduled to attend to the workstation, and is assigned to the workstation at the time when the potentially fraudulent activity occurred. In particular, a record is accessed from an employee database of a client, wherein the record corresponds to the scheduled agent. As such, the record may include information detailing the name of the scheduled agent, a photo image of the agent, the department within which that agent works, the employee identification number, and other identifying information.

In some implementations, the second identifying information is determined from information obtained in addition to the employee record information. This may provide supporting information used to verify the identity of the positioned agent. For example, instead of using information related to a scheduled agent, log-in information for an attending agent may be used. That is, biometric information of an agent (e.g., the agent attending the workstation) is captured during a log-in process at the first workstation, and cross-referenced with known biometric information stored in employee records of the plurality of agents to determine the identity of the attending agent, wherein the employee records may be stored in a client database. The log-in process may have been performed prior to the time when the potential fraudulent activity occurred, and as such, the attending agent may not be the positioned agent, who may be committing the potentially fraudulent activity while acting as the attending agent. As an illustration, a fingerprint of the attending agent may be collected, information of the eye of the agent may be collected, and any other biological data may be used to identify an agent that is supposedly assigned to the workstation and/or attending to the workstation. Still other information may be used, such as the log-in name that is authenticated by the agent (e.g., through a password).

Thereafter, the first identifying information (e.g., captured image) and the second identifying information (e.g., employee record information, biometric information, etc.) may be further cross-referenced to identify the positioned agent. Specifically, the facial image of the positioned agent is cross-referenced with the employee record information (e.g., employee photo) of the scheduled agent, or the attending agent identified through the log-in process. For example, the image of the positioned agent is compared against an image of the scheduled and/or attending agent previously determined. If there is a match, then the positioned agent is verified and authenticated as the scheduled agent and/or the attending agent.

On the other hand, if the facial image of the positioned agent does not match the record information related to the scheduled or attending agent, then the method determines that the positioned agent is not the scheduled agent, and additional operations may be performed to identify the positioned agent. For example, facial recognition techniques may be performed on the facial image and cross referenced with information in each of the employee records to match the positioned agent with an employee record. In addition, further notification may be provided indicating that the potential fraudulent activity is being performed by a non-scheduled agent. This notification may be provided to the security center, to the security specialist at the security center, and/or provided by updating the status information within a contact center chart (e.g., icon indicating such notification).

Figure 5A:
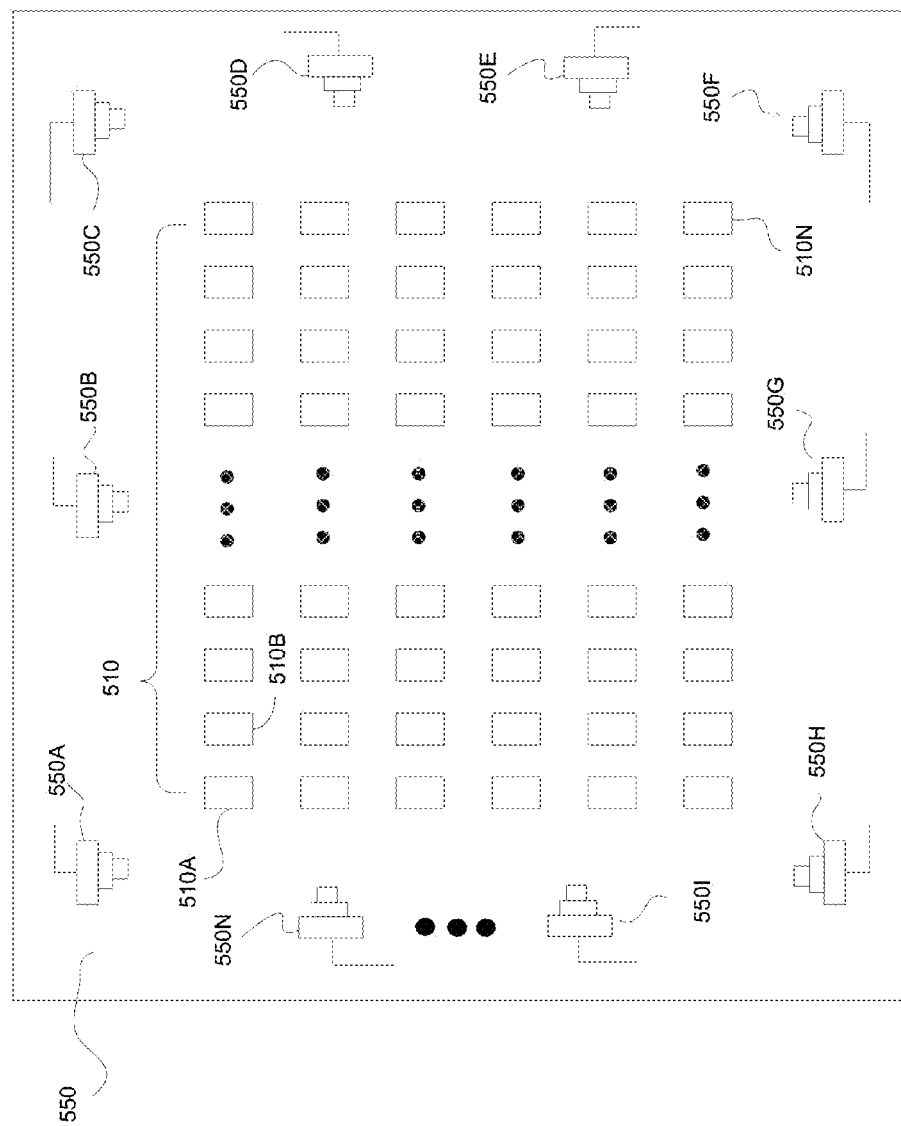
FIG. 5A is a diagram illustrating a contact center floor including a plurality of workstations, and a video monitor system configured to view each of the workstations, in accordance with one embodiment of the present disclosure.

FIG. 5A is a diagram illustrating a contact center floor 500A including a plurality of workstations, and an image capturing system 550 (e.g., camera or video monitoring system) that is configured to view each of the workstations, in accordance with one embodiment of the present disclosure. A plurality of workstations 510 is organized throughout the contact center floor 500A. As shown, workstations 510A-N are spread across one building floor 500A of the contact center.

More specifically, the image capturing system 550 may include one or more image capturing devices 550A-N. For example, the system 550 may include wall or ceiling mounted devices that are each able to view multiple workstations. In addition, image capturing system 550 may include image capturing devices that are configured to capture images of a single workstation, such as a device that is integrated within a display screen of a computing resource at a corresponding workstation (not shown). As such, an appropriate image capturing device may be activated and instructed to capture at least one image of a corresponding workstation where potentially fraudulent activity is occurring, and/or at least one image of the positioned agent committing the potentially fraudulent activity.

In FIG. 5A, each of the image capturing devices 550A-N is controllable to orient itself to a targeted workstation, for e.g., a workstation where potentially fraudulent activity is occurring. Once the targeted workstation is identified, at least one image capturing device in the image capturing system 550 is instructed to orient itself so as to have a view of the targeted workstation.

Figure 5B:
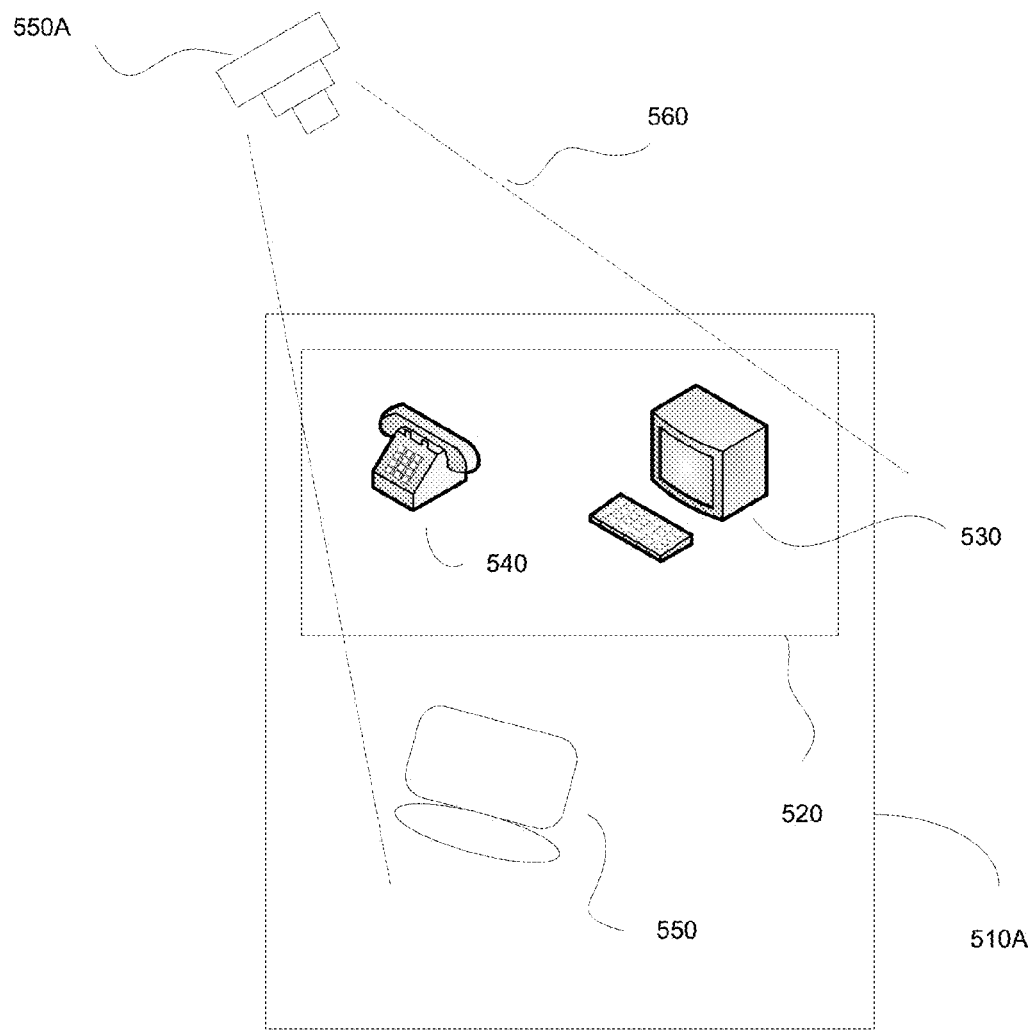
FIG. 5B is a diagram illustrating a typical layout of resources available to a contact center workstation, and a video capture device configured and oriented to capture a frontal view of an agent attending to the workstation when instructed, such that images of the workstation are captured when potential fraudulent activity is detected at that workstation, in accordance with one embodiment of the present disclosure.

FIG. 5B is a diagram illustrating a typical layout of resources available to a contact center workstation 510A of FIGS. 5A-B, and an image capturing device 550A configured and oriented to capture a frontal view of a positioned agent attending to the workstation. As shown, workstation 510A includes a computing resource 530 (e.g., computer system and keyboard) used for communication and/or accessing client resources, and a communication resource 540 (e.g., telephone or audio headset) used for communicating with a customer of a client. Both the computer resource 530 and communication resource 540 can be placed on top of a working platform 520 (e.g., desk). A positioned agent sits in the chair 550 when using the computing resource 520, such as when performing potentially fraudulent activity. As such, the workstation 510A is compartmentalized as a unit to provide everything that a service agent needs in a minimum amount of space. In many instances, the agent's computer is coupled to a computer network providing among others, back-end resources, virtual computers, informational databases, a communication path with an immediate supervisor, connection to other contact centers, or a routing protocol to further route the interaction with a customer (e.g., call) to a more appropriate agent or division.

As shown in FIGS. 5A-B, image capturing device 550A is configured to have a view of the targeted workstation 510A. For example, when oriented correctly, image capturing device 550A has a field-of-view 560 that includes workstation 510A. As such, image capturing device 550A may be instructed to capture at least one image of the workstation and/or positioned agent simultaneous with or in association with the detection of potentially fraudulent activity occurring at workstation 510A, in accordance with one embodiment of the present disclosure. As such, the image capturing device 550A may be activated, and oriented (e.g., pan, tilt, and zoom) so as to have a magnified view of the workstation 510A, and/or the positioned agent attending to the workstation 510A.

FIG. 6 is a flow diagram 600 illustrating a method for performing fraud detection, such as within a contact center, in accordance with one embodiment of the present disclosure. In still another embodiment, flow diagram 600 illustrates a computer implemented method for performing fraud detection, such as within a contact center. In another embodiment, flow diagram 600 is implemented in part within a fraud detection system that includes a computer processor, and memory coupled to the processor and having stored therein instructions that, if executed by the computer system causes the system to execute a method for performing fraud detection, such as within a contact center. In still another embodiment, instructions for performing a method as outlined in flow diagram 600 are stored on a non-transitory computer-readable storage medium having computer-executable instructions for causing a computer system to perform a method for performing fraud detection, such as within a contact center. In embodiments, the method outlined in flow diagram 600 is implementable by one or more components of the systems 100, 200, 300, 500A of FIGS. 1-3 and 5, respectively.

While contact center agents inherently have access to personal identifying information of customers through client based resources, these agents should only use this access on a need-to-access basis. For example, access can be authorized when an agent is handling or is involved in an interaction, such as handling a call and conducting a conversation with a customer on the phone. In another example, access is authorized when the agent has a valid reason for accessing data when not involved in an interaction with any customer (handling a call), such as when the agent is reviewing the customer account for quality assurance purposes. Embodiments of the present invention as described in flow diagram 600 are used to identify when an agent is in violation of a particular set of criteria, namely when accessing client resources when not involved in an interaction (e.g., on a call) with a customer.

At 610, the method includes determining that a first agent at a first workstation of a contact center is not handling an interaction or in not involved in an interaction with a customer (e.g., on a call) at a first time. As previously described, the contact center includes a plurality of workstations attended to by a plurality of agents. Activities of each agent including interactions with the resources of the workstation, as well as performance of the resources of the workstation, are monitored, as previously described. In that manner, through monitoring, the activity of the agent is known, including whether the agent is currently involved in an interaction with a customer, handling a call, is available to handle an interaction, is available to handle a call, is out to lunch, is logged-in or logged-out, etc.

In one instance, when the agent is not involved in an interaction (e.g., on a call), the agent may be available for handling an interaction (e.g., taking a call) with a customer of the client, or another client (e.g., when the agent is handling interactions (e.g., calls) with multiple clients). In another instance, the agent may be on lunch. That is, the agent has actively input his or her status into the computing resource at the workstation to indicate that the agent is taking a break, and more specifically a lunch break. Still other examples are contemplated for when the agent is not handling an interaction with a customer (e.g., on a call).

Also, at 620, the method includes determining that the first agent is accessing a client based resource at the first time. The resource is associated with a client. Again, this determination is made through monitoring of the agent and/or the activities performed on resources of the workstation. As previously described, the resource may be a database containing personal and identifiable information of employees, customers, partners, etc., all in association with a client. In another implementation, the resource may be an application that can be used to access personal and identifiable information, and used to assist the agent when handling an interaction or when involved in an interaction with a customer (e.g., handling a customer service call). Because the agent is accessing client resources while not handling an interaction or when not involved in an interaction with a customer (e.g., on a service call), an occurrence of potential fraudulent activity is occurring at the first time. That is, two criteria need to be satisfied in order to determine the occurrence of potential fraudulent activity, including an agent who is not involved in or is not handling an interaction (e.g., handling a call) with a customer, and the same agent also accessing a client based resource. As such, a rule is violated thereby indicating the occurrence of potential fraudulent activity when the two criteria are satisfied.

In one embodiment, the application is an unauthorized application of the client. For example, the client may be associated with two types of applications: white listed applications that are accessible at any time by the agent, even when the agent is not involved in or not handling an interaction with a customer (e.g., on a call); and black listed applications that are only accessible on a need-to-access basis, such as when the agent is involved in or is handling an interaction (e.g., conducting a service call) with a customer. For illustration, a white listed application may include a training application that helps the agent address various types of interactions with a customer (e.g., types and/or fact situations of service calls). On the other hand, a black listed application may include a banking application that allows an agent to access a one or more personal banking accounts associated with the customer and held by the client bank. In this case, access to the banking application may be restricted to times when the agent is handling an interaction or is involved in an interaction with a customer (e.g., handling a service call), because personal and identifiable information should not be accessed when the agent is not handling an interaction and/or not involved in an interaction (e.g., on a call) with customers.

At 630, the method includes collecting electronic evidence of the first workstation. For example, electronic evidence may include activities being conducted on the resources (e.g., computing system, telephone, etc.) of the workstation, one or more images of the workstation, one or more images of the positioned agent at the workstation, images of the desktop of the computing system at the workstation, and other evidence identifying the positioned agent and/or supporting the verification of fraudulent activity being conducted at the workstation.

In one implementation, when collecting electronic evidence, an image capturing device is activated, and an instruction is provided to capture at least one image of the workstation, and/or the positioned agent at the workstation. For example, the device may be part of an image capturing system including strategically installed devices (e.g., high definition cameras) that can pan, tilt, and zoom to pre-defined coordinates in order to focus in on a targeted workstation, and take a facial photo of the positioned attending to the targeted workstation at the same time the fraud activity is happening. The image capturing devices may be mounted on walls and/or ceilings of a contact center floor, or a device integrated within a display screen of a computing resource of a workstation, or a device located within and dedicated to a particular workstation.

In another embodiment, further actions may be taken when it is determined that potential fraudulent activity has occurred in order to determine whether or not actual fraud has occurred. These actions may be taken automatically, or by a security specialist at a security center in near real-time or at a later moment in time. For example, one activity being performed by the positioned agent may be cross-referenced with another activity that is performed by the positioned agent in order to determine if the agent is performing appropriate duties when at the workstation. As an illustration, the positioned agent may be identified as a supervisor or any designated employee who is given blanket authorization to access client resources at any workstation. In another illustration, the positioned agent may be accessing applications of the client that can be accessed at any time.

In some embodiments, once actual fraud is determined, the method may include taking a predefined action. For example, an additional action may be taken to block the fraudulent access. For example, the resources of the workstation may be blocked and/or locked so that no actions may be taken using those resources. In still another instance, an action taken may include recording a predetermined period of contact center agent activity for evidence and investigation purposes.

Figure 7A:
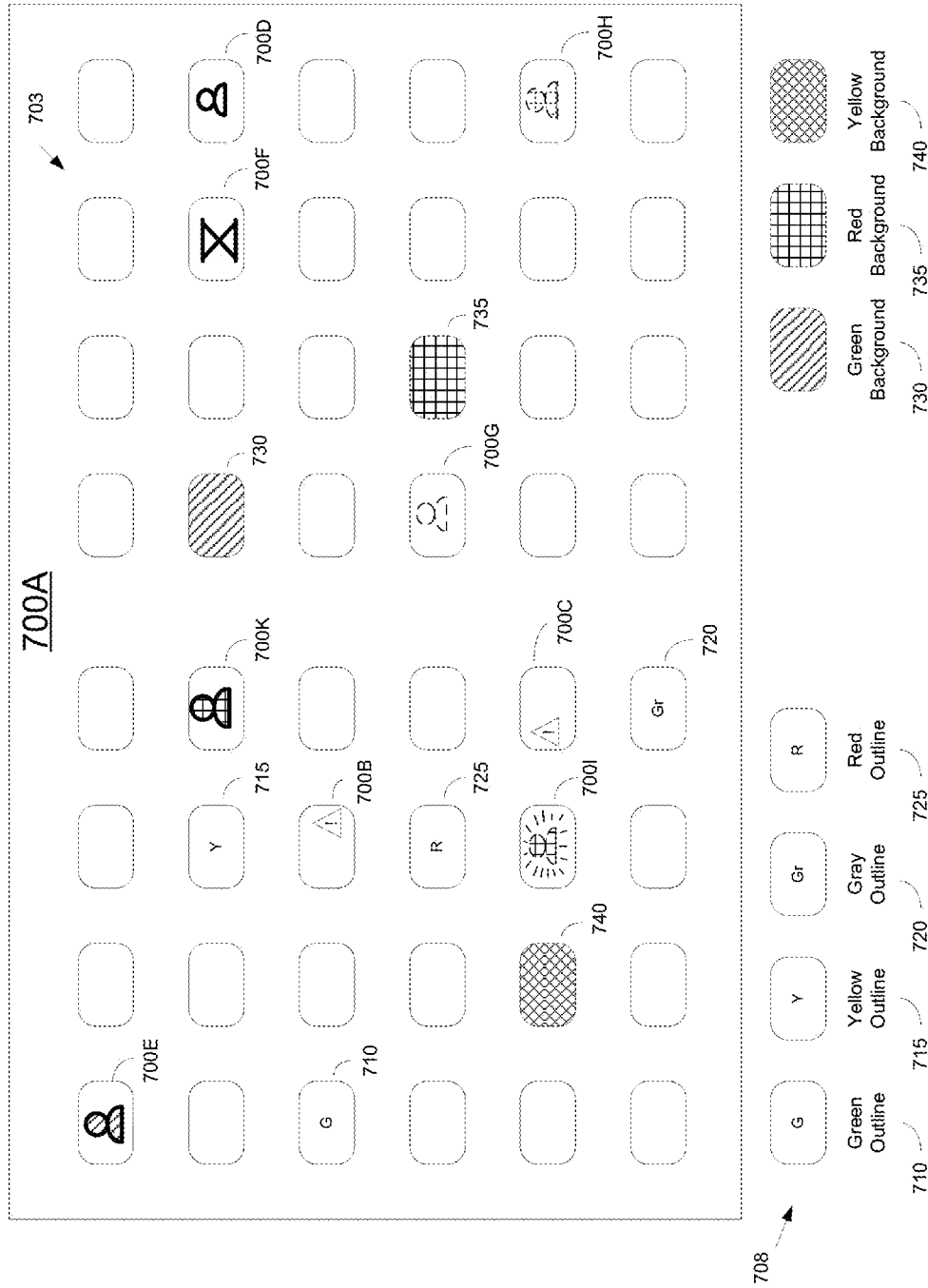
FIG. 7A is a diagram of a chart illustrating workstations and their locations within a contact center section or floor, wherein the icons representing the workstations may be augmented to provide information related to the status of agents and/or workstations, as well as information providing notification when potential fraudulent activity is detected at one or more workstations, in accordance with one embodiment of the present disclosure.

FIG. 7A is a diagram of a chart 700A illustrating workstations and their locations within a contact center section or floor, wherein the icons representing the workstations may be augmented to provide information related to the status of agents and/or workstations, as well as information providing notification when potential fraudulent activity is detected at one or more workstations, in accordance with one embodiment of the present disclosure. The generation and maintenance of chart 700A may be performed by map generator 265 of the security center 260 of FIG. 2, in one embodiment.

Chart 700A illustrates a section of a contact center. For example, the section may be representative of a floor of a building, or a portion of the floor. In addition, chart 700A identifies a plurality of workstations 703, including the approximate location of each workstation on the floor. While embodiments of the present invention describe chart 700A as providing the locations of workstations to include relative positioning between workstations though not necessarily drawn to scale, other embodiments provide a mapping of workstations that may not be true to the actual and relative positioning between workstations, but is instead used to provide a visual reference to each workstation shown in the chart 700A. In general, chart 700A provides a quick reference as the real time activities of the plurality of agents in the plurality of workstations 703.

In chart 700A, each workstation is represented by an icon. For instance, the icon may be a rectangle, having soft corners, as is shown in FIG. 7A. More particularly, the rectangle is shown as an outline and/or a boundary. Variations in how the outline is presented may be used to convey information, such as the log-in status of an agent attending to the workstation. For example, a first color of the outline indicates that an agent is logged-in to the corresponding workstation. In one implementation, a green outline shown in icon 710 of the legend 708 and map 700A indicates that an agent is logged-in to the workstation. In another example, a second color of the outline indicates that no agent is logged-in to the corresponding workstation. That is, the workstation is inactive. In one implementation a gray outline shown in icon 720 of legend 708 and map 700A indicates an agent is not logged-in. In still another example, a third color of the outline indicates that an agent of a corresponding workstation is out to lunch. In one implementation, a yellow outline shown in icon 715 of legend 708 and map 700A indicates an agent is at lunch for a corresponding workstation. In another example, a fourth color of the outline indicates that the corresponding workstation is locked, for instance by an agent that is logged-in to that workstation. In one implementation, a red outline shown in icon 725 of legend 708 and map 700A indicates that the corresponding workstation is locked. Also, a bolded outline may indicate that the corresponding workstation is selected by a user (e.g., a currently selected workstation).

Color backgrounds or fill-ins to the icons representing workstations may provide a quick reference to one or more pre-defined activities. For example, a first colored background of the rectangle outline indicates that everything is satisfactory in the corresponding workstation. In one implementation, a green background shown in icon 730 of legend 708 and map 700A may indicate normal activity at a corresponding workstation, and especially that no fraud has been detected. In some implementations, when activity by the agent violates a predefined rule, the background of the corresponding workstation icon will change to a specified color or change from one color (e.g., green) to another, and provide an alert that represents an event occurrence. In particular, a second colored background of the rectangle outline indicates that potential fraudulent activity has been detected at a corresponding workstation. In another implementation, a yellow background shown in icon 740 of legend 708 and map 700A indicates that activity of a corresponding workstation matches certain criteria that has been pre-defined as indicating potential fraudulent activity has occurred. The yellow background provides a visual notification of potential fraudulent activity being conducted at a corresponding workstation.

In still another example, a third colored background of the rectangle outline indicates that potential fraudulent activity has been detected, and that additional event review must be performed for that workstation. In one implementation, a red background shown in icon 735 of legend 708 and map 700A indicates that an event review is necessary for the corresponding workstation.

Once the icon changes to one of the various non-normal condition colors, additional actions may take place, such as the initiation of an event review. These actions may be automatically triggered, or may require additional human actions to be performed (e.g., event review to determine if actual fraud has occurred). For instance, as previously described, details of the activity are recorded such that the predefined actions capture the evidence needed to prosecute fraudulent agents as well as collect the information in real time for investigation purposes. These may include recorded video and/or audio of the agent. They may also include recording computer screen activity, and recording activity on the computer (e.g., accessing applications).

The outline and/or background of the rectangle representing a workstation may be used in conjunction with other icons, symbols, shadings, etc. to provide information relating to the corresponding workstation. For example, the information may represent activity of an agent or the emotional state of an agent, including whether the agent is handling an interaction or is involved in an interaction with a customer, on a call, on hold, available to handle an interaction, available to take a call, not available to handle an interaction, not ready to take another call (e.g., busy with a task, or on another call), logged-in, logged-out, etc. In particular, a visual cue representing an activity status may be placed in a location in association with the workstation icon (e.g., outline of rectangle). The visual cue may provide the status of an agent attending to a corresponding workstation, and/or provide the status of one or more resources used in a corresponding workstation. The location of the visual cue may be inside and centered in the workstation icon, adjacent to (e.g., right side, left side, up from and down from) the workstation icon, inside and offset to one side or another within the workstation icon, etc. FIGS. 7B-K are diagrams of various symbols and/or visual cues providing information related to status of agents and/or workstations, as well as information providing notification when potential fraudulent activity is detected at one or more workstations, in accordance with one embodiment of the present disclosure.

Figure 7B:
FIGS. 7B-J are diagrams of various symbols providing information related to status of agents and/or workstations, as well as information providing notification when potential fraudulent activity is detected at one or more workstations, in accordance with one embodiment of the present disclosure.

FIG. 7B is an illustration of an icon 700B representing a workstation. Icon 700B is also shown in FIG. 7A. Icon 700B may include a warning symbol 751, wherein a warning symbol generally indicates that an event that is out of the ordinary has occurred, and may require additional attention. In one implementation, the warning symbol is colored with a yellow background and a blackened exclamation point. In addition, the location of a warning symbol in relation to the outline 771 of icon 700B may provide additional information. For example, warning symbol 751 that is included in the interior of outline 771, but offset to the right of the outline 771, may indicate that a phone threshold has been breached. For example, the phone may be turned off while the agent is logged-in to the workstation, or the phone is malfunctioning, or the phone has been placed on hold for a too-long of a period, etc.

Figure 7C:
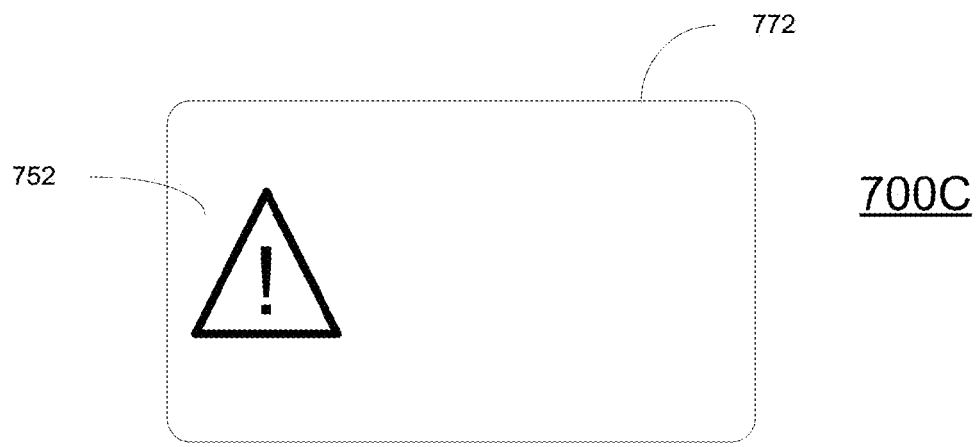

FIG. 7C is an illustration of an icon 700C representing a workstation. Icon 700C is also shown in FIG. 7A. Icon 700C may include a warning symbol 752, wherein a warning symbol generally indicates that an event that is out of the ordinary has occurred, and may require additional attention. In addition, the location of a warning symbol in relation to the outline 772 of icon 700C may provide additional information. For example, warning symbol 752 that is included within the interior of outline 772, but offset to the left of the outline 772, may indicate that a desktop threshold has been breached. For example, the desktop may be turned off while the agent is logged-in to the workstation, or the desktop may be malfunctioning, or the desktop may have been inactive for too long of a period, etc.

In another implementation, a warning symbol that is included within the interior of an outline of an icon, but is offset towards the top middle, may indicate that a raised hand threshold has been breached. That is, too much time may have elapsed before satisfying a raised hand even, wherein a raised hand event indicates that an agent is waiting to be acknowledged or is requesting supervisor help. For example, a hand symbol located at the upper right corner of the outline of an icon may indicate a raised hand event for the corresponding workstation. Further, the hand symbol may be colored pink or red to indicate immediate attention is required. When the raised hand event has been acknowledged and addressed (e.g., a supervisor has spoken to the agent), then the hand symbol may change colors. For example, the hand symbol located at the upper right corner of the outline of the icon may change from red to green. After the raised hand event has been addressed, the hand symbol may be removed from the interior of the outline of the icon after a period of time.

Figure 7D:
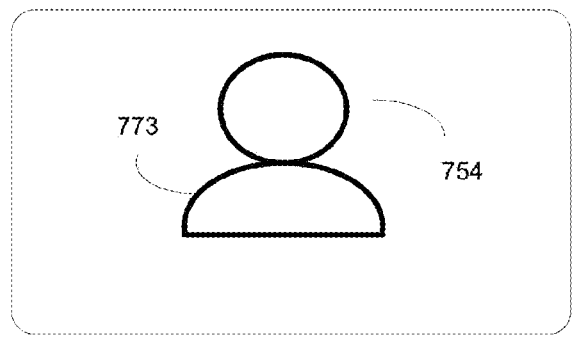

FIG. 7D is an illustration of an icon 700D representing a workstation. Icon 700D is also shown in FIG. 7A. Icon 700D may include a humanoid like torso or bust 754, that is generally representative of an agent. As shown in FIG. 7D, an outline 773 of bust 754 is shown. The outline 773 may be of a first color, and indicates that the agent is available to handle an interaction and/or is available to be involved in an interaction (e.g., take a call) with a customer. In one implementation, outline 773 is colored green to indicate that the agent of a workstation is available to handle an interaction with a customer (e.g., ready to take a call).

Figure 7E:
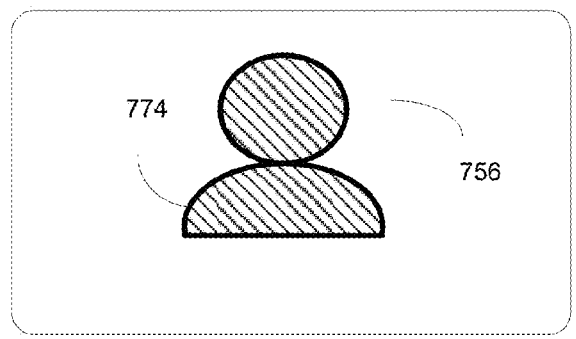

The bust of an agent as represented in an icon may be colored or filled-in to provide a quick reference to an activity being performed by an agent, the status of the agent, the emotional state of the agent, or any other state or condition relating to the agent. FIG. 7E is an illustration of an icon 700D representing a workstation. Icon 700E is also shown in FIG. 7A. Icon 700E may include a bust 756, that is generally representative of an agent. As shown, bust 756 has an outline 774. In this particular example, a colored fill-in of the bust 756 indicates an emotional state of the agent, and in particular, that the agent is satisfied. Further, the colored fill-in may also indicate that the agent is currently involved in an interaction and/or handling an interaction with a customer (on a call with a customer), and/or otherwise performing normal activities. In one implementation, a green fill-in illustrated by the diagonal lines leaning to the left of bust 756 indicates that the agent is involved in and/or handling an interaction with a customer (e.g., on a call), and that everything is normal with the agent and/or the interaction (e.g., call). In one embodiment, the outline 774 is of the same color (e.g., green).

Figure 7F:
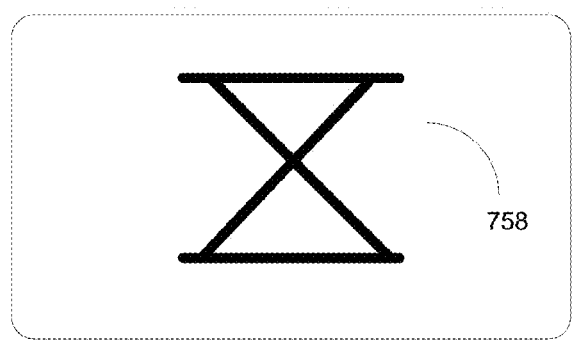

FIG. 7F is an illustration of an icon 700F representing a workstation. Icon 700F is also shown in FIG. 7A. Icon 700F may include a symbol 758 that represents a sand timer (e.g., hourglass) and indicates that an agent has placed a customer on hold at a corresponding workstation.

Figure 7G:
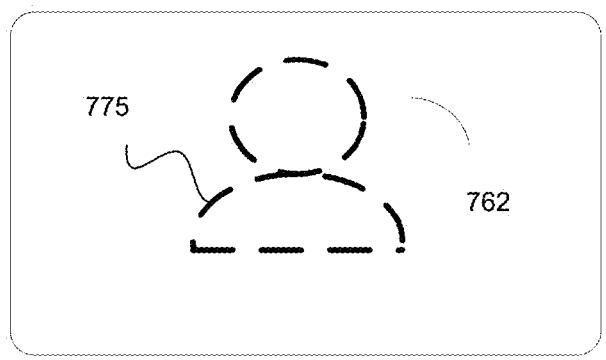

FIG. 7G is an illustration of an icon 700G representing a workstation. Icon 700G is also shown in FIG. 7A. Icon 700G may include a humanoid like bust 762, that is generally representative of an agent. As shown in FIG. 7G, an outline 775 of bust 762 is shown. The outline 775 may be of a particular color, and indicates that the agent is unavailable to take be involved in and/or unavailable to handle an interaction (e.g., a call). For example, the agent may be busy completing a task (e.g., project, performing log-in, etc.) In one implementation, outline 775 is colored red to indicate that the agent of a workstation is unavailable to handle an interaction and/or is unavailable to be involved in an interaction (e.g., agent is not ready to take a call).

Figure 7H:
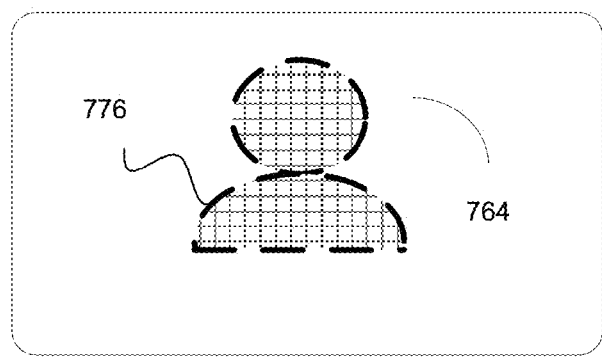

FIG. 7H is an illustration of an icon 700H representing a workstation. Icon 700H is also shown in FIG. 7A. Icon 700H may include a bust 764, that is generally representative of an agent. As shown, bust 764 has an outline 776 that is colored or filled-in to provide a quick reference to an activity or state or condition relating to the agent. In this example, a colored fill-in of the bust 764 indicates an emotional state of the agent, and in particular that the agent is angry or agitated. In one implementation, a red fill-in illustrated by the cross-hatching in bust 764 indicates that the agent is angry or agitated.

Figure 7I:
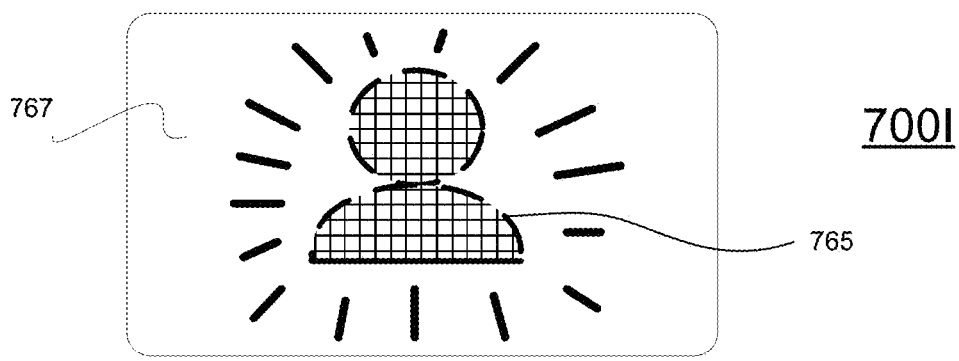

FIG. 7I is an illustration of an icon 700I representing a workstation. Icon 700I is also shown in FIG. 7A. Icon 700I may include a bust 765 that is generally representative of an agent. As shown, bust 765 may be colored or filled-in to indicate an emotional state of the agent. For example, the fill-in may be colored red, to indicate that the agent is angry or agitated. Further, bust 765 may be flashing, wherein the flashing indicates that there is an underlying issue. For example, the flashing may indicate that potentially fraudulent activity is occurring at the corresponding workstation. As an illustration, certain criteria may have been detected during monitoring, such as the phone is reporting that is on a call, but the workstation is reporting that it is in a logged-out status, or that the phone is reporting that is on a call, but the workstation is reporting that it is in a locked or lunch status.

Figure 7J:
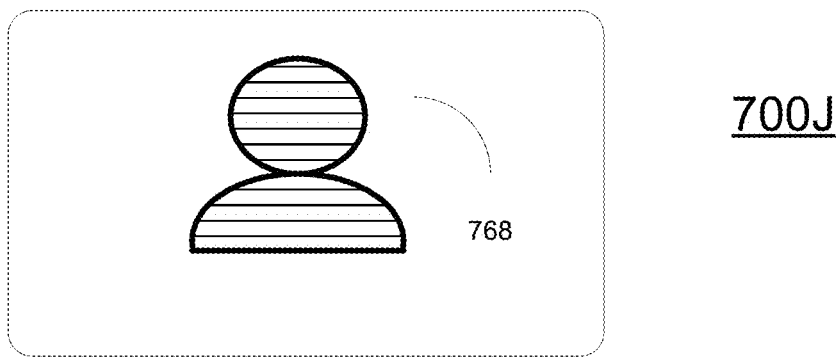

FIG. 7J is an illustration of an icon 700J representing a workstation. Icon 700J is also shown in FIG. 7A. Icon 700J may include a bust 768 that is generally representative of an agent. As shown, bust 768 may be colored or filled-in to indicate an emotional state of the agent. For example, the fill-in may be colored yellow, to indicate that the agent is stressed.

Each of the icons, symbols, shadings, etc. used to provide information relating to a corresponding workstation shown in FIGS. 7A-J may be presented in any combination to represent multiple pieces of information. For example, an icon with an background that is colored red, and including a bust having a fill-in that is colored green may indicate that the agent is currently involved in and/or is handling an interaction with a customer (e.g., on a call) and is generally satisfied, but that an event occurrence (e.g., potential fraudulent activity has occurred) requires review. In another case, a bust having an outline that is colored green may indicate that the agent is available to be involved in and/or to handle an interaction with a customer (e.g., take a call), and having a fill-in that is colored red may indicate that the agent is angry or agitated. This may indicate that the agent may not be in the best emotional state when handling the next interaction (e.g., call).

In embodiments, event review is necessary to determine if potential fraudulent activity that has been detected is actually fraud. As previously discussed, notification of an event review may be presented through a red background of an workstation icon, such as icon 735 of chart 700A in FIG. 7A. In one implementation, chart 700A is viewable by a security specialist (e.g., a personal "Risk Analyst" or fraud specialist/observer) who monitors activities of agents as a full time responsibility. The security specialist can open the notification of event review (e.g., red background in icon 735) by clicking on the cubicle icon, in accordance with one embodiment of the present disclosure. From there the security specialist can access additional electronic information related to the event (e.g., occurrence of potential fraudulent activity) that triggered the notification of event review. For instance, the information may include event details, date and time of event occurrence, name of the contact center agent who is logged into the cubicle, an employee photo of that individual, and a live camera photo of the positioned agent attending to the workstation for comparison and evidence purposes. For example, event information relating to an unauthorized access of a client resource may include in addition to the above, the status of an agent regarding the handling of or being involved in an interaction, the call status of the agent (e.g., not ready and/or not on a call), the time since the last entry on the computing resource (e.g., 0.41 seconds), time since handling the last interaction (e.g., seconds from the last call), an internet protocol (IP) address of an accessed client resource, time stamp of the alert, and a message providing additional any additional information.

In one embodiment, the security specialist has the ability to remotely connect to the workstation in real time, thereby enabling the security specialist to see exactly what the positioned agent sees on their screen. In addition, evidence is electronically captured during this period. This enables the security specialist to observe the activities of the positioned agent, such as observing accesses to client resources. For example, activity such as viewing one or multiple customers personal and identifiable information without being involved in interactions with those customers (e.g., not handling a call with those customers) is a significant indication of fraudulent activity. In some embodiments, the event review is handled automatically, such as by using rules defining fraudulent behavior or activity and determining whether the evidence of potential fraudulent activity matches those rules. In other embodiments, the review of agent activity and/or evidence in relation to a event notification of potential fraudulent activity occurs at a later time. That is, the agent activity as well as any triggers (e.g., event notification, rule violations, etc.) of potential fraudulent activity is stored and accessed at a later time for analysis.

Once an activity has been classified as being fraudulent, additional measures can be taken in an effort to curb future occurrences of fraud by the agent committing the fraud, and by other agents in the contact center who are aware of the fraud being committed. That is, the enforcement of negative consequences against an agent who has been shown to be committing fraud will act to deter future fraudulent activity by other contact center agents who are aware of the negative consequences. The knowledge by agents that the contact center has controls in place to combat fraud can provide a necessary and sufficient deterrent to the performance of future fraudulent activity. Negative consequences for an agent committing fraudulent activity may include public confrontation of the agent, loss of job, and possible civil and/or criminal prosecution. To illustrate, once fraudulent activity has been verified, a contact center representative (e.g., human resources, account manager, supervisor, security specialist, etc.) may publicly confront the agent at his or her workstation and/or on the floor of the contact center. The agent is then escorted out from the workstation and away from the floor of the contact center. The agent is terminated, and further escorted out of the contact center. Public law enforcement may be contacted to open a case. The agent may further be prosecuted in civil and/or criminal courts using the evidence collected by embodiments of the present invention, as previously described.

Additional measures can be taken to reduce and prevent the occurrence of fraudulent activity. For example, robust security awareness training may be conducted, such as during employment initiation, and further on a periodic basis. A signed non-disclosure agreement must be signed to verify that the agent is aware of the security issues. In addition, background checks on potential employees may be conducted, for example to filter out individuals who are known to have committed fraud. In another example, electronic messages that indicate what activities are authorized for a particular agent at a particular point in time are delivered. For example, once an agent finishes up an interaction with a customer (e.g., finishes up with a call), one or more messages may be delivered for display on a display screen viewable by the agent, wherein the messages list both authorized actions that the agent can perform (e.g., access training resources, white listed applications, etc.), and unauthorized actions that the agent must not perform (e.g., access black listed applications, access client resources having personal and identifiable information, etc.). In still another example, a "clean desk" environment is enforced at workstations in the contact center. That is, agents are not allowed to bring any personal items into the contact center, other than the clothes they are wearing. Any personal items (e.g., paper, pencil, etc.) that could be used to "leak" information out of the contact center are strictly prohibited within the contact center. Other measures used to prevent fraud are implementable and used in combination with embodiments of the present invention.

Thus, according to embodiments of the present invention, method and systems for detecting and preventing fraud within a contact center are disclosed.

While the foregoing disclosure sets forth various embodiments using specific block diagrams, flow charts, and examples, each block diagram component, flow chart step, operation, and/or component described and/or illustrated herein may be implemented, individually and/or collectively. In addition, any disclosure of components contained within other components should be considered as examples because many other architectures can be implemented using the inventive principles described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments.

The invention claimed is:

1. A method of fraud detection, comprising:
monitoring activity of a plurality of agents attending to a plurality of workstations of a contact center;
determining that a first agent at a first workstation of said contact center is not on a call at a first time;
determining that said first agent is accessing a client based resource at said first time, wherein said client based resource is associated with and managed by a client at a back end server remote from said contact center, wherein said client based resource is accessed by an electronic resource at said first workstation through a communication network; and
collecting electronic evidence of said first contact center workstation, wherein said electronic evidence is associated with potential fraudulent activity being conducted at said first workstation, wherein said potential fraudulent activity occurs when a first condition is satisfied when said first agent is not said call at said first time, and when a second condition is satisfied when said first agent is accessing said client based resource at said first time.

2. The method of claim 1, wherein said determining that said first agent is accessing a client based resource further comprises:
determining that said first agent is accessing an unauthorized application of said client, wherein said unauthorized application becomes authorized for access when said first agent is actively on a call providing services to a customer of said client.

3. The method of claim 1, wherein said client based resource comprises a database.

4. The method of claim 1, wherein said determining that a first agent is not on a call at a first time comprises:
determining that said first agent is available to take a call from a customer of said client or another client.

5. The method of claim 1, wherein said determining that a first agent is not on a call at a first time comprises:
determining that said first agent is out for lunch.

6. The method of claim 1, wherein said collecting electronic evidence comprises:
aiming a camera positioned to view at least one workstation in said call center at said first workstation; and
capturing at least one image of said first workstation, wherein said at least one image comprises a frontal view of said first agent.

7. The method of claim 1, wherein said collecting electronic evidence comprises:
activating a camera positioned on a display screen of said first workstation; and
capturing at least one image of said first workstation, wherein said at least one image comprises a frontal view of said first agent.

8. The method of claim 1, wherein said collecting electronic evidence comprises:
capturing at least one image of a desktop of said first workstation.

9. The method of claim 1, further comprising:
determining identifying information for a scheduled agent assigned to said first workstation at said first time from an employee database;
capturing an image of a positioned agent located at said first workstation in relation to said first time;
cross-referencing said image of said positioned agent with said identifying information; and
authenticating that said positioned agent is said scheduled agent.

10. The method of claim 1, further comprising:
determining identifying information for a scheduled agent assigned to said first workstation;
capturing an image of a positioned agent located at said first workstation;
cross-referencing said image of said positioned agent with said information;
authenticating that said positioned agent is not said scheduled agent.

11. The method of claim 1, further comprising:
providing notification of said potential fraudulent activity conducted at said first workstation on a contact center chart, wherein said chart identifies said plurality of workstations, wherein a first icon represents a first workstation in said chart, wherein said first icon is configured to indicate said potential fraudulent activity is being conducted at said first workstation.

12. A method of fraud detection, wherein said method comprises:
monitoring electronic activity of a plurality of agents attending to a plurality of workstations of a contact center;
collecting said electronic activity that is monitored at a centralized location;
determining that a potential fraudulent activity is conducted in said contact center;
determining said potential fraudulent activity occurs at a first workstation;
providing an event notification of said potential fraudulent activity on a contact center chart, wherein said contact center chart indicates locations of each call workstation and status information for each contact center workstation; and
capturing at least one image of said first contact center workstation;
wherein said determining that a potential fraudulent activity is conducted in said contact center comprises:
determining that a first agent at said first workstation of said contact center is not on a call at a first time;
determining that said first agent is accessing a client based resource at said first time, wherein said resource is associated with and managed by a client at a back end server remote from said contact center, wherein said client based resource is accessed by an electronic resource at said first workstation through a communication network; and collecting electronic evidence of said first contact center workstation.

13. The method of claim 12, wherein said capturing at least one image comprises:
aiming a camera at said first workstation, wherein said camera is positioned to view at least one workstation at said contact center;
capturing at least one image frame of a frontal view of said first workstation; and
capturing a frontal view of said first agent in said at least one image frame.

14. The method of claim 13, further comprising:
panning said camera in a direction capable of viewing said first workstation;
tilting said camera at an angle capable of viewing said first workstation; and
zooming said camera in on said first workstation.

15. The method of claim 12, wherein said capturing at least one image comprises:
activating a camera positioned on a display screen of said first contact center workstation; and
capturing at least one image of said first workstation, wherein said at least one image comprises a frontal view of said first agent.

16. The method of claim 12, further comprising:
determining an identity of a positioned agent located at said first workstation by capturing first identifying information of said positioned agent;
determining second identifying information for a scheduled agent assigned to said first workstation at said first time by accessing a record corresponding to said scheduled agent from an employee database;
cross-referencing said first identifying information of said positioned agent with said second identifying information;
authenticating that said positioned agent is said scheduled agent when said first identifying information matches said second identifying information, wherein said event notification comprises first information that said potential fraudulent activity is being conducted by said scheduled agent; and
determining that said positioned agent is not said scheduled agent when said first identifying information does not match said second identifying information, wherein said event notification comprises second information that said potential fraudulent activity is being conducted by a non-scheduled agent to a security center.

17. The method of claim 16, wherein said cross-referencing said first identifying information of said positioned agent comprises:
capturing a facial image of said positioned agent, wherein said first identifying information comprises said facial image;
accessing a second image of said scheduled agent in said record;
comparing said second image to said facial image of said positioned agent; and
verifying said positioned agent is said scheduled agent when said second image matches said facial image.

18. The method of claim 16, wherein said determining second identifying information for a scheduled agent comprises:
capturing first biometric information of an agent performing a log-in process at said first workstation;
cross-referencing said biometric information with a plurality of known biometric information corresponding with said plurality of agents;
matching said first biometric information captured to second biometric information associated with said scheduled agent.

19. The method of claim 12, wherein said determining that a potential fraudulent activity is conducted further comprises:
determining a baseline of transactions/actions by said plurality of agents, wherein said baseline corresponds to at least a first activity;
identifying an outlier condition that is outside of said baseline, wherein said outlier condition corresponds to said potential fraudulent activity; and
matching the outlier condition with a known fraudulent activity.

* * * * *